United States Patent Office 2,871,166
Patented Jan. 27, 1959

2,871,166

FERMENTATION OF OXYTETRACYCLINE BY STREPTOMYCES RIMOSUS

Joseph Jacob Goodman, Nanuet, N. Y., assignor to American Cyanamid Company, New York, N. Y., a corporation of Maine No Drawing. Application December 12, 1956
Serial No. 627,755

4 Claims. (Cl. 195—114)

This invention relates to the production of oxytetracycline and more particularly is concerned with an improved method of increasing the fermentation yields of oxytetracycline by *Streptomyces rimosus* fermentations.

The production of oxytetracycline by cultivating a strain of *S. rimosus* in an aqueous nutrient medium under submerged aerobic conditions is described in U. S. Patent to Sobin et al. No. 2,516,080.

It has now been discovered that increased fermentation yields of oxytetracycline are obtainable by adding proper fluoride levels to *S. rimosus* fermentations. Thus, in accordance with the present invention, when fluoride ion is added to the fermentation medium in proper amounts the production of oxytetracycline may be increased by as much as 70% as compared to fementations in which no fluoride ion is added to the medium.

Any convenient source of fluoride ion may be used as, for example, the alkali metal or alkaline earth metal salts, e. g. sodium fluoride, potassium fluoride, calcium fluoride, barium fluoride, etc. In particular, it has been found that the potassium fluoride dihydrate salt $KF \cdot 2H_2O$ gives excellent results although, as stated above, the particular salt used is of little consequence since it is the fluoride ion and not the alkali metal or alkaline earth metal which produces the desired result.

It has been found that increased oxytetracycline yields may be obtained when fluoride ion is added in as little as about five parts per million. Ordinarily, the preferred range of fluoride ion addition will be from about 50 parts per million to 300 parts per million although at the higher levels the fluoride ion may be somewhat toxic to the microorganism.

The conditions of the fermentation are generally the same as those that have been described for producing oxytetracycline by fermentation with the exception of providing proper fluoride levels in accordance with the present invention. Thus, the fermentation medium contains, in addition to the described fluoride ion, the usual nutrients and mineral substances. Suitable nutrient substances which may provide those necessary substances include starch, dextrose, cane sugar, glucose, molasses, soybean meal, peanut meal, yeast, meat extracts, peptone, ammonium sulfate, urea, corn steep liquor, distillers solubles, fish meal and other conventional substances. The inorganic salts include such things as calcium carbonate, ammonium sulfate, ammonium chloride, and the various trace elements such as manganese, cobalt, zinc, copper, iron and the like.

The other general conditions of the fermentation, such as hydrogen ion concentration, temperature, time, rate of aeration, preparation of the inoculum, sterilization, inoculation and the like are conventional and may be similar to those for the production of oxytetracycline shown in the above-referred to patent to Sobin et al.

Similarly, the recovery of the oxytetracycline from the fermentation liquor is conventional and need not be described as various methods for recovering oxytetracycline from fermentations liquors are described in the aforesaid Sobin et al. patent.

In the examples which follow the yields of oxytetracycline are expressed in gammas per milliliter ($\lambda$/ml.).

The invention will be described in greater detail in conjunction with the following specific examples.

EXAMPLE 1

A fermentation medium containing a large amount of chloride ion was made up as follows:

| | | |
|---|---|---|
| Corn steep liquor | grams per liter | 25 |
| $CaCO_3$ | do | 9 |
| $(NH_4)_2SO_4$ | do | 5.6 |
| Starch | do | 47 |
| $NH_4Cl$ | do | 1.7 |
| Cottonseed flour | do | 5 |
| Corn flour | do | 14.5 |
| $MnSO_4.(70\%)$ | milligrams per liter | 80 |
| $CoCl_2.6H_2O$ | do | 5 |
| Lard oil | percent v./v | 3 |

A chloride-free fermentation medium was made up as follows:

| | | |
|---|---|---|
| Resin dehagolenated corn steep | grams per liter | 30 |
| $CaCO_3$ | do | 7 |
| $(NH_4)_2SO_4$ | do | 5 |
| Low chloride starch | do | 55 |
| Cottonseed flour | do | 5 |
| $MnSO_4.4H_2O$ | milligrams per liter | 50 |
| $H_3PO_4(85\%)$ | do | 200 |
| Lard oil | percent v./v | 2 |

The microorganisms were grown for 24 hours in a medium composed of

| | Grams per liter |
|---|---|
| Corn steep liquor | 20 |
| $(NH_4)_2SO_4$ | 2 |
| Sucrose | 30 |
| $CaCO_3$ | 7 |

One milliliter of this inoculum was transferred to 25 milliliters of the fermentation medium described above. The media were dispensed in appropriate amounts into flasks and incubated at 26.5° C. on a rotary shaker for 96 hours. They were then assayed for the oxytetracycline content. The results obtained appear in the tables below.

*Table 1*

CHLORIDE RICH MEDIUM

| Fluoride Parts Per Million | Oxytetracycline, $\gamma$/ml. | | | |
|---|---|---|---|---|
| | Strain T1686A | Strain T1686B | Strain T3086 | Strain A8846 |
| 0 | 1,365 | 1,350 | 378 | 1,090 |
| 50 | 1,865 | 2,300 | 519 | 1,625 |

*Table 2*

CHLORIDE FREE MEDIUM

| Fluoride Parts Per Million | Oxytetracycline, $\gamma$/ml. | | | |
|---|---|---|---|---|
| | Strain T1686A | Strain T1686B | Strain T3086 | Strain A8846 |
| 0 | 1,060 | 790 | 380 | 987 |
| 50 | 1,210 | 1,155 | 626 | 1,175 |

EXAMPLE 2

The procedure of the preceding example was repeated using *S. rimosus* (strain T1686B) and in which the levels of fluoride were varied. The results obtained are shown in the following table.

Table 3
OXYTETRACYCLINE, γ/ML.

| Fluoride as KF, Parts per Million | Chloride Rich Medium | Chloride Free Medium |
|---|---|---|
| 0 | 2,160 | 1,510 |
| 50 | 2,495 | 2,120 |
| 100 | 2,010 | 1,750 |
| 150 | 1,850 | 1,792 |

I claim:

1. The process of producing oxytetracycline by aerobic fermentation of an aqueous fermentation medium with a strain of *S. rimosus* which comprises carrying out the fermentation in the presence of added fluoride ion so as to increase the yield of oxytetracycline.

2. The process of producing oxytetracycline by aerobic fermentation of an aqueous fermentation medium with a strain of *S. rimosus* which comprises carrying out the fermentation in the presence of at least about five parts per million of fluoride ion so as to increase the yield of oxytetracycline.

3. The process of producing oxytetracycline by aerobic fermentation of an aqueous fermentation medium with a strain of *S. rimosus* which comprises carrying out the fermentation in the presence of from about 5 to 300 parts per million of fluoride ion so as to increase the yield of oxytetracycline.

4. The process according to claim 3 in which potassium fluoride as the dihydrate salt is used.

References Cited in the file of this patent

UNITED STATES PATENTS

| 478,418 | Effront | July 5, 1892 |
| 2,516,080 | Sobin et al. | July 18, 1950 |
| 2,734,018 | Minieri et al. | Feb. 7, 1956 |
| 2,739,924 | Lein et al. | Mar. 27, 1956 |

FOREIGN PATENTS

| 16,093 | Great Britain | of 1889 |